(12) United States Patent  
Evans et al.

(10) Patent No.: US 12,478,384 B2
(45) Date of Patent: Nov. 25, 2025

(54) OSTEOCHONDRAL PLUG FORMING SYSTEMS AND METHODS

(71) Applicant: University of Utah Research Foundation, Salt Lake City, UT (US)

(72) Inventors: Zackery K. Evans, Woods Cross, UT (US); T. Wade Fallin, Hyde Park, UT (US); Travis G. Maak, Park City, UT (US); Charles L. Saltzman, Salt Lake City, UT (US)

(73) Assignee: University of Utah Research Foundation, Salt Lake City, UT (US)

( * ) Notice: Subject to any disclaimer, the term of this patent is extended or adjusted under 35 U.S.C. 154(b) by 0 days.

(21) Appl. No.: 18/940,917

(22) Filed: Nov. 8, 2024

(65) Prior Publication Data

US 2025/0195087 A1 Jun. 19, 2025

Related U.S. Application Data

(60) Provisional application No. 63/612,200, filed on Dec. 19, 2023.

(51) Int. Cl.
| | | |
|---|---|---|
| *A61B 17/16* | (2006.01) | |
| *A61F 2/30* | (2006.01) | |
| *A61F 2/28* | (2006.01) | |

(52) U.S. Cl.
CPC ...... *A61B 17/1635* (2013.01); *A61F 2/30756* (2013.01); *A61F 2002/2839* (2013.01)

(58) Field of Classification Search
CPC .......................... A61B 17/1635; A61F 2/4607
See application file for complete search history.

(56) References Cited

U.S. PATENT DOCUMENTS

| | | |
|---|---|---|
| 4,565,192 A | 1/1986 | Shapiro |
| 6,676,662 B1 | 1/2004 | Bagga et al. |
| 7,591,820 B2 | 9/2009 | Schmieding et al. |
| 7,722,608 B2 | 5/2010 | Steiner et al. |
| 7,780,668 B2 | 8/2010 | Steiner et al. |
| 7,955,335 B2 | 6/2011 | Gil et al. |
| 7,955,336 B2 | 6/2011 | Gil et al. |
| 7,997,174 B2 | 8/2011 | Gil et al. |
| 8,043,315 B2 | 10/2011 | Shepard |
| 8,118,814 B2 | 2/2012 | Oren et al. |
| 8,221,423 B2 | 7/2012 | Gil et al. |
| 8,317,793 B2 | 11/2012 | Gil et al. |
| 8,430,880 B2 | 4/2013 | Gil et al. |
| 8,486,074 B2 | 7/2013 | Steiner et al. |
| 8,523,864 B2 | 9/2013 | Malinin |

(Continued)

*Primary Examiner* — Andrew Yang
(74) *Attorney, Agent, or Firm* — David Meibos; Maywood IP Law

(57) ABSTRACT

A method of preparing and/or delivering an osteochondral plug may include, positioning a tissue graft on a cutting guide, wherein the tissue graft may have been removed from a larger body of tissue to define a shaped surface. The tissue graft may include a top surface having a cartilage surface. The method may further include advancing a first cutter along a cutting direction toward the tissue graft to cut the tissue graft to form the osteochondral plug having an external wall parallel to the cutting direction and transverse to the top surface. Positioning the tissue graft on the cutting guide may include placing the shaped surface on a registration surface of the cutting guide. The registration surface may have a reference shape that corresponds to a shape of at least part of the shaped surface.

37 Claims, 9 Drawing Sheets

(56) References Cited

U.S. PATENT DOCUMENTS

| | | |
|---|---|---|
| 8,882,774 B2 | 11/2014 | Malinin |
| 8,893,596 B2 | 11/2014 | Gil et al. |
| 8,926,615 B2 | 1/2015 | Ek |
| 8,998,918 B2 | 4/2015 | Jamali |
| 9,918,769 B2 | 3/2018 | Provencher et al. |
| 10,034,778 B2 | 7/2018 | Bosworth et al. |
| 10,206,730 B2 | 2/2019 | Provencher et al. |
| 10,736,755 B2 | 8/2020 | Bosworth et al. |
| 10,905,437 B2 | 2/2021 | Pfeiffer et al. |
| 11,213,406 B2 | 1/2022 | Rodriguez et al. |
| 2002/0082704 A1 | 6/2002 | Cerundolo |
| 2004/0034360 A1 | 2/2004 | Dalton |
| 2004/0034362 A1 | 2/2004 | Abdelgany et al. |
| 2015/0105696 A1 | 4/2015 | Litke et al. |
| 2019/0374351 A1 | 12/2019 | Mologne et al. |
| 2022/0117758 A1 | 4/2022 | Rodriguez et al. |

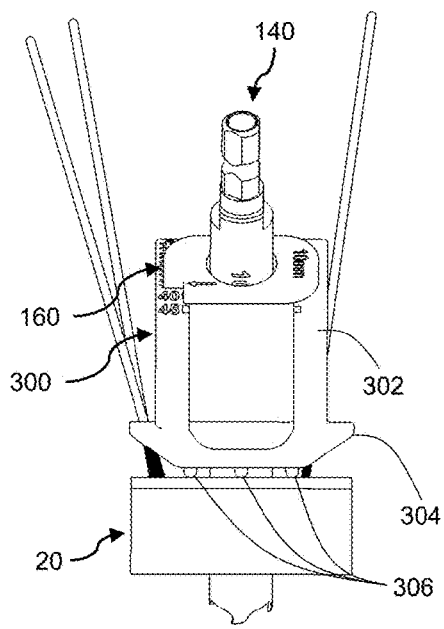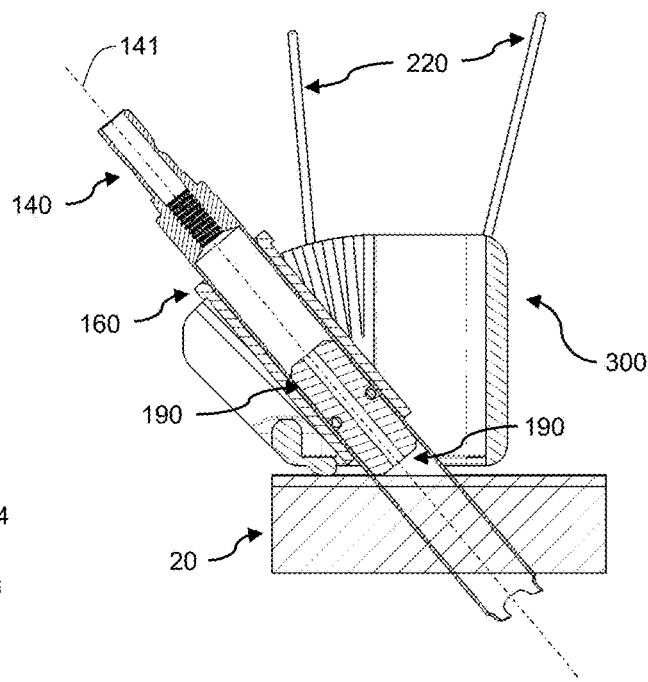
FIG. 6A  FIG. 6B
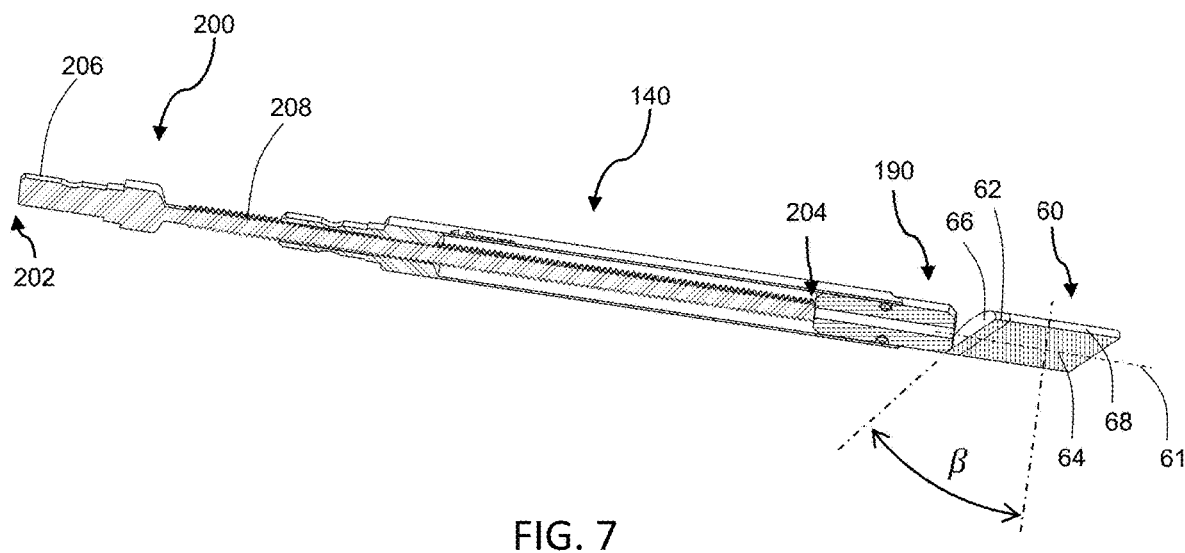
FIG. 7

OSTEOCHONDRAL PLUG FORMING SYSTEMS AND METHODS

CROSS-REFERENCE TO RELATED APPLICATIONS

The present application claims the benefit of U.S. Provisional Application No. 63/612,200 filed on Dec. 19, 2023, entitled OSTEOCHONDRAL PLUG FORMING SYSTEM, which is incorporated by reference as though set forth herein in its entirety.

TECHNICAL FIELD

The present disclosure relates to the field of systems, methods, and devices for preparing and/or delivering osteochondral plugs.

BACKGROUND

Systems, devices, and/or methods for preparing and/or delivering osteochondral plugs are known in the art. However, there is not a system, device, and/or method that can provide the level of geometrical precision or complexity desirable for osteochondral plugs used as a graft to restore and replicate the normal, complex, three-dimensional anatomy of the injured or diseased osteochondral tissue. Thus, there is a need for an improved system, device, and/or method for preparing and/or delivering osteochondral plugs with enhanced geometrical features, such as diameter, length, cartilage surface contour, and cartilage surface orientation reference. Finally, there is a need for preparing and/or delivering osteochondral plugs from larger cylindrical plugs or from bulk material comprised of autograft, allograft, other biological materials, synthetic materials, or combinations thereof.

SUMMARY

The various systems and methods of the present disclosure have been developed in response to the present state of the art, and in particular, in response to the problems and needs in the art that have not yet been fully solved by currently available devices and methods for preparing and/or delivering osteochondral plugs.

In some embodiments, a method of preparing and/or delivering an osteochondral plug may include, positioning a tissue graft on a cutting guide, wherein the tissue graft may have been removed from a larger body of tissue to define a shaped surface. The tissue graft may include a top surface having a cartilage surface. The method may further include advancing a first cutter along a cutting direction toward the tissue graft to cut the tissue graft to form the osteochondral plug having an external wall parallel to the cutting direction and transverse to the top surface. Positioning the tissue graft on the cutting guide may include placing the shaped surface on a registration surface of the cutting guide. The registration surface may have a reference shape that corresponds to a shape of at least part of the shaped surface.

In the method of any preceding paragraph, the method may further include, prior to positioning the tissue graft on the cutting guide, removing the tissue graft from the larger body of tissue.

In the method of any preceding paragraph, the first cutter may include a trephine that may include a trephine bore configured to receive the osteochondral plug in the trephine bore as the first cutter advances along the cutting direction.

In the method of any preceding paragraph, the tissue graft may further include a bottom surface and the method may further include, prior to advancing the first cutter along the cutting direction to cut the tissue graft, measuring a surface angle of tissue needed at a graft recipient site, and selecting the cutting direction such that, relative to the bottom surface and/or the external wall, the top surface may be oriented at the surface angle.

In the method of any preceding paragraph, selecting the cutting direction may include selecting from a discrete number of cutting directions displaced from each other by an angular offset.

In the method of any preceding paragraph, the method may further include, prior to advancing the first cutter along the cutting direction, coupling a guide sleeve to the cutting guide such that the guide sleeve extends along the cutting direction relative to the cutting guide, wherein advancing the first cutter along the cutting direction may include guiding advancement of the first cutter with the guide sleeve.

In the method of any preceding paragraph, the guide sleeve may include a fin, the cutting guide may include a plurality of slots oriented at different angles relative to each other, and coupling the guide sleeve to the cutting guide may include inserting the fin into one slot of the plurality of slots that corresponds to the cutting direction.

In the method of any preceding paragraph, the tissue graft may further include a bottom surface and the method may further include, advancing a second cutter toward the tissue graft to cut the tissue graft to remove the bottom surface, thereby creating a new bottom surface perpendicular to the cutting direction.

In the method of any preceding paragraph, advancing the second cutter toward the tissue graft may include guiding the second cutter with a planar guide surface of the cutting guide.

In the method of any preceding paragraph, the method may further include, after advancing the first cutter along the cutting direction toward the tissue graft to cut the tissue graft, selecting a trial with a trial surface that may correspond to a surface angle of tissue needed at a graft recipient site, inserting the trial into a receptacle of a plug cutting guide, inserting the osteochondral plug into the plug cutting guide such that the top surface may lie along the trial surface, and guiding the second cutter with a planar guide surface of the plug cutting guide.

In the method of any preceding paragraph, the method may further include, after advancing the first cutter along the cutting direction toward the tissue graft to cut the tissue graft, inserting the osteochondral plug into a bore of a delivery device, wherein the bore may be shaped to match the external wall, aligning the delivery device with a graft recipient site, and moving the osteochondral plug from the delivery device to the graft recipient site.

In the method of any preceding paragraph, moving the osteochondral plug from the delivery device to the graft recipient site may include inserting the osteochondral plug into the graft recipient site along an antegrade direction.

In the method of any preceding paragraph, moving the osteochondral plug from the delivery device to the graft recipient site may include inserting the osteochondral plug into the graft recipient site along a retrograde direction.

In the method of any preceding paragraph, the method may further include, prior to inserting the osteochondral plug into the delivery device, aligning a plug orientation reference of the osteochondral plug with a device orientation reference of the delivery device to determine an orientation of the osteochondral plug, wherein moving the osteochondral plug from the delivery device to the graft recipient site may include inserting the osteochondral plug into the graft recipient site at the orientation.

In the method of any preceding paragraph, the method may further include, prior to aligning the plug orientation reference with the device orientation reference, inserting a pin into the osteochondral plug to define the plug orientation reference, wherein, the delivery device may include a slot in communication with the bore, and aligning the plug orientation reference with the device orientation reference may include inserting the pin into the slot.

In the method of any preceding paragraph, the top surface may be non-perpendicular to the cutting direction.

In some embodiments, a method of preparing and/or delivering an osteochondral plug may include, inserting a pin into the osteochondral plug at a predetermined orientation. The osteochondral plug may include, a top surface, and an external wall that extends transverse to the top surface. The method may further include, inserting the osteochondral plug into a bore of a delivery device such that the pin may be received in a slot of the delivery device to establish an orientation of the osteochondral plug, and moving the osteochondral plug from the delivery device to a graft recipient site at the orientation.

In the method of any preceding paragraph, the osteochondral plug further includes a bottom surface transverse to the external wall. The method may further include, measuring a surface angle of a surface of surrounding tissue at the graft recipient site, and forming the osteochondral plug such that the top surface may be at the surface angle, relative to the bottom surface, wherein moving the osteochondral plug from the delivery device to the graft recipient site at the orientation may include placing the osteochondral plug in the graft recipient site such that the top surface may be at the surface angle that matches the surface of surrounding tissue of the graft recipient site.

In the method of any preceding paragraph, inserting the pin into the osteochondral plug may include inserting the pin into the external wall.

In the method of any preceding paragraph, moving the osteochondral plug from the delivery device to the graft recipient site may include inserting the osteochondral plug into the graft recipient site along an antegrade direction.

In the method of any preceding paragraph, moving the osteochondral plug from the delivery device to the graft recipient site may include inserting the osteochondral plug into the graft recipient site along a retrograde direction.

In some embodiments, a method of preparing and/or delivering an osteochondral plug may include, positioning a tissue graft on a cutting guide, the tissue graft including a top surface having a cartilage surface, securing the top surface to a registration surface of the cutting guide, and advancing a first cutter along a cutting direction toward the tissue graft to cut the tissue graft to form the osteochondral plug having an external wall, wherein the external wall may be parallel to the cutting direction and transverse to the top surface.

In the method of any preceding paragraph, the method may further include, prior to positioning the tissue graft on the cutting guide, removing the tissue graft from a larger body of tissue.

In the method of any preceding paragraph, the first cutter may include a trephine having a trephine bore configured to receive the osteochondral plug in the trephine bore as the first cutter advances along the cutting direction.

In the method of any preceding paragraph, the tissue graft may further include a bottom surface transverse to the external wall. The method may further include, prior to advancing the first cutter along the cutting direction to cut the tissue graft, measuring a surface angle of tissue needed at a graft recipient site, and selecting the cutting direction such that, relative to the bottom surface and/or the external wall, the top surface is oriented at the surface angle.

In the method of any preceding paragraph, selecting the cutting direction may include selecting from a discrete number of cutting directions displaced from each other by an angular offset.

In the method of any preceding paragraph, the method further including, prior to advancing the first cutter along the cutting direction, coupling a guide sleeve to the cutting guide such that the guide sleeve extends along the cutting direction relative to the cutting guide, advancing the first cutter along the cutting direction may include guiding advancement of the first cutter with the guide sleeve.

In the method of any preceding paragraph, the guide sleeve may include a fin, the cutting guide may include a plurality of slots oriented at different angles relative to each other, and coupling the guide sleeve to the cutting guide may include inserting the fin into one slot of the plurality of slots that corresponds to the cutting direction.

In the method of any preceding paragraph, the tissue graft further may include a bottom surface transverse to the external wall, and the method may further include advancing a second cutter toward the tissue graft to cut the tissue graft to remove the bottom surface, thereby creating a new bottom surface perpendicular to the cutting direction.

In the method of any preceding paragraph, the method further including, after advancing the first cutter along the cutting direction toward the tissue graft to cut the tissue graft, selecting a trial with a trial surface that corresponds to a surface angle of tissue needed at a graft recipient site, inserting the trial into a receptacle of a plug cutting guide, inserting the osteochondral plug into the plug cutting guide such that the top surface lies along the trial surface, and guiding the second cutter with a planar guide surface of the plug cutting guide.

In the method of any preceding paragraph, the method may include, after advancing the first cutter along the cutting direction toward the tissue graft to cut the tissue graft, inserting the osteochondral plug into a bore of a delivery device, wherein the bore is shaped to match the external wall, aligning the delivery device with a graft recipient site, and moving the osteochondral plug from the delivery device to the graft recipient site.

In the method of any preceding paragraph, moving the osteochondral plug from the delivery device to the graft recipient site may include inserting the osteochondral plug into the graft recipient site along an antegrade direction.

In the method of any preceding paragraph, moving the osteochondral plug from the delivery device to the graft recipient site may include inserting the osteochondral plug into the graft recipient site along a retrograde direction.

In the method of any preceding paragraph, the method may further include, prior to inserting the osteochondral plug into the delivery device, aligning a plug orientation reference of the osteochondral plug with a device orientation reference of the delivery device to determine an orientation of the osteochondral plug, wherein moving the osteochondral plug from the delivery device to the graft recipient site may include inserting the osteochondral plug into the graft recipient site at the orientation.

In the method of any preceding paragraph, the method may further include, prior to aligning the plug orientation reference with the device orientation reference, inserting a pin into the osteochondral plug to define the plug orientation reference, wherein the delivery device may include a slot in communication with the bore, and aligning the plug orientation reference with the device orientation reference may include inserting the pin into the slot.

In the method of any preceding paragraph, the top surface and the registration surface may be planar.

In the method of any preceding paragraph, the top surface may be non-perpendicular to the cutting direction.

These and other features and advantages of the present disclosure will become more fully apparent from the following description and appended claims or may be learned by the practice of the implants, systems, and methods set forth hereinafter.

BRIEF DESCRIPTION OF THE DRAWINGS

Exemplary embodiments of the present disclosure will become more fully apparent from the following description taken in conjunction with the accompanying drawings. Understanding that these drawings depict only exemplary embodiments and are, therefore, not to be considered limiting of the scope of the present disclosure, the exemplary embodiments of the present disclosure will be described with additional specificity and detail through use of the accompanying drawings in which:

FIG. 6A is a front view of the cutting guide assembly of FIG. 5.

FIG. 6B is a side section view of the cutting guide assembly of FIG. 6A.

FIG. 7 is a perspective section view of a push rod, a trephine, a bushing of the cutting guide assembly of FIG. 6A and a partially formed plug.

Figure 1:
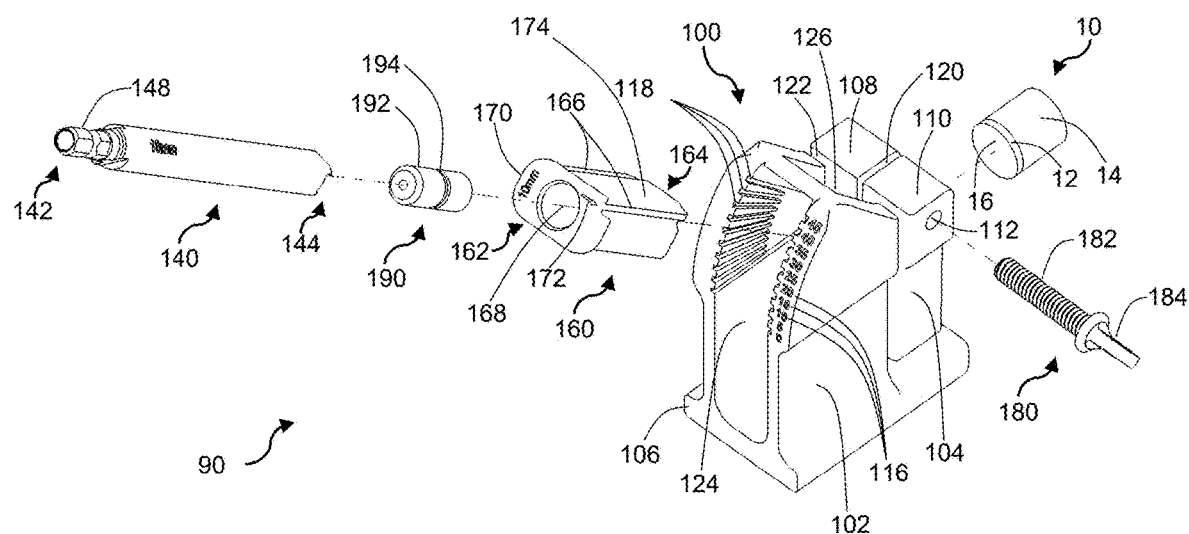
FIG. 1 is an exploded perspective view of a cutting guide assembly, according to an embodiment of the present disclosure.

It is to be understood that the drawings are for purposes of illustrating the concepts of the present disclosure and are drawn to scale according to certain embodiments. In alternative embodiments, dimensions of the drawings may be varied to provide different features and benefits. Furthermore, the drawings illustrate exemplary embodiments and do not represent limitations to the scope of the present disclosure.

DETAILED DESCRIPTION

Exemplary embodiments of the present disclosure will be best understood by reference to the drawings, wherein like parts are designated by like numerals throughout. It will be readily understood that the components of the present disclosure, as generally described and illustrated in the drawings, could be arranged, and designed in a wide variety of different configurations. Thus, the following more detailed description of the embodiments of the devices, systems, and methods, as represented in the drawings, is not intended to limit the scope of the present disclosure but is merely representative of exemplary embodiments of the present disclosure.

The word "exemplary" is used herein to mean "serving as an example, instance, or illustration." Any embodiment described herein as "exemplary" is not necessarily to be construed as preferred or advantageous over other embodiments. While the various aspects of the embodiments are presented in the drawings, the drawings are not necessarily drawn to scale unless specifically indicated.

The following examples have been included to provide guidance to one of ordinary skill in the art for practicing representative embodiments of the presently disclosed subject matter. Considering the present disclosure and the general level of skill in the art, those of skill can appreciate that the following examples are intended to be exemplary only and that numerous changes, modifications, and alterations can be employed without departing from the scope of the presently disclosed subject matter.

For purposes of interpreting this specification, the following definitions will apply. In the event that any definition set forth below conflicts with any document incorporated herein by reference, the definition set forth below shall control.

Bone and cartilage are referred to, collectively, as "tissue." "Proximal" means closer to a user, "distal" means farther away from a user. For example, the handle of a screwdriver is on a proximal end, and the drive tip of a screwdriver is on a distal end. "Parallel" direction means a direction that is parallel to an object such as an instrument longitudinal axis. "Circumferential" direction means in a direction around the circumference of an object, for example, along a circumference encircling an instrument longitudinal axis.

The phrases "connected to," "coupled to" and "in communication with" refer to any form of interaction between two or more entities, including mechanical, electrical, magnetic, electromagnetic, fluid, and thermal interaction. Two components may be functionally coupled to each other even though they are not in direct contact with each other. The term "coupled" can include components that are coupled to each other via integral formation, as well as components that are removably and/or non-removably coupled with each other. The term "abutting" refers to items that may be in direct physical contact with each other, although the items may not necessarily be attached together. The phrase "fluid communication" refers to two or more features that are connected such that a fluid within one feature is able to pass into another feature. As defined herein the term "substantially" means within +/−10% of a target value, measurement, or desired characteristic.

Figure 2A:
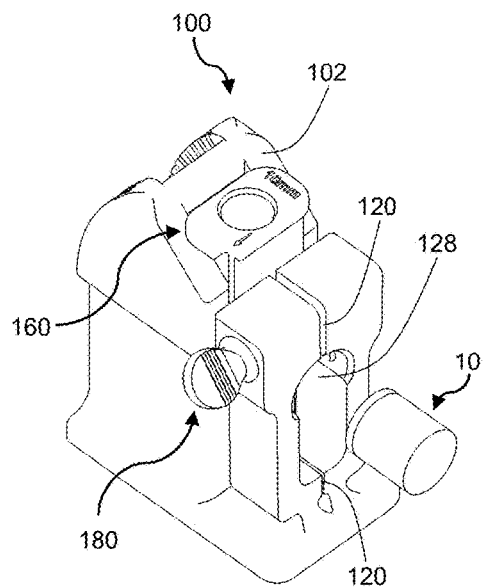
FIG. 2A is a perspective view of a cutting guide, a guide sleeve, and a graft plug of the cutting guide assembly of FIG. 1.
Figure 2B:
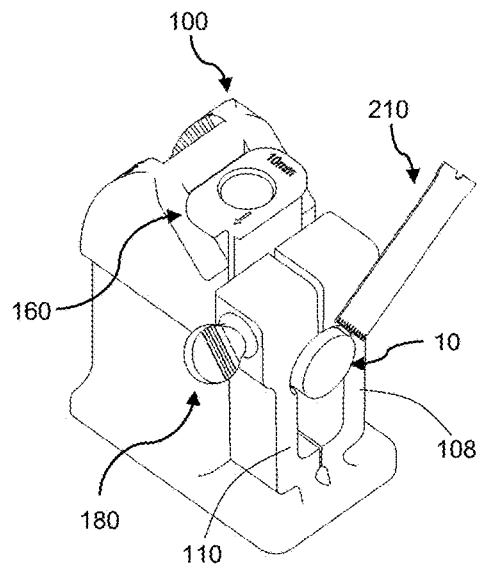
FIG. 2B is a perspective view of a cutting guide, a guide sleeve, and a graft plug of the cutting guide assembly of FIG. 1 and a saw blade.
Figures 3A, 3B:
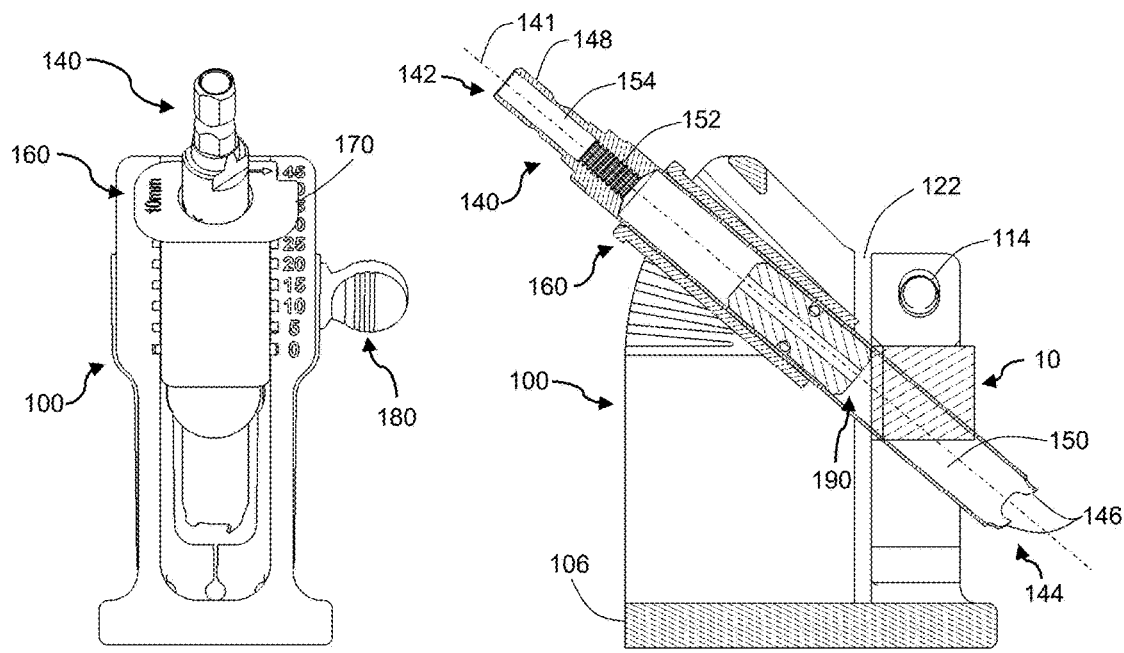
FIG. 3A is a front view of the cutting guide assembly of FIG. 1.
FIG. 3B is a side section view of the cutting guide assembly of FIG. 3A.
Figure 4:
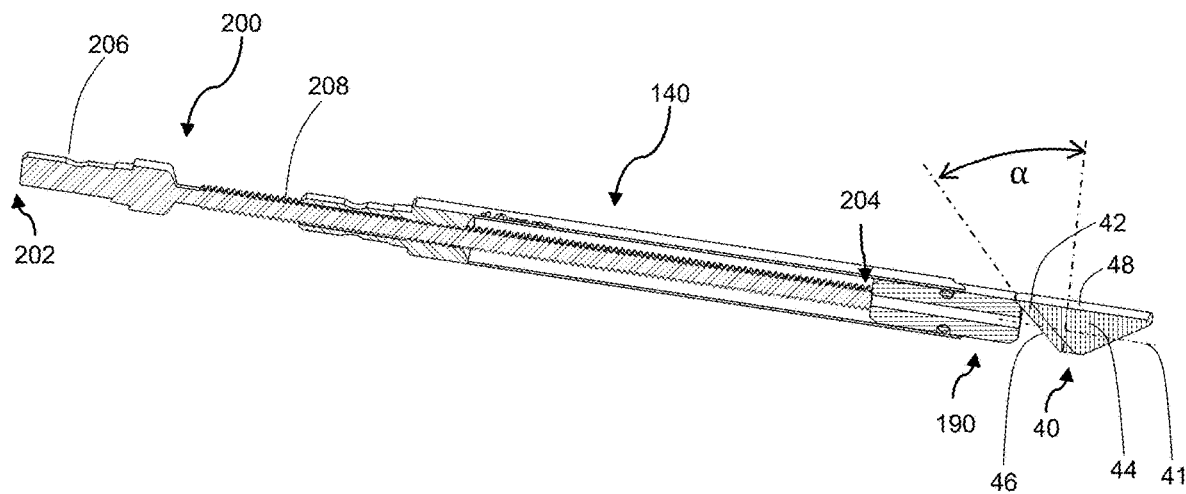
FIG. 4 is a perspective section view of a push rod, a trephine, a bushing of the cutting guide assembly of FIG. 3A and a partially formed plug.

FIG. 1 is an exploded perspective view of a cutting guide assembly, according to an embodiment of the present disclosure. FIG. 2A is a perspective view of a cutting guide, a guide sleeve, and a graft plug of the cutting guide assembly of FIG. 1. FIG. 2B is a perspective view of a cutting guide, a guide sleeve, and a graft plug of the cutting guide assembly of FIG. 1 and a saw blade. FIG. 3A is a front view of the cutting guide assembly of FIG. 1. FIG. 3B is a side section view of the cutting guide assembly of FIG. 3A. FIG. 4 is a perspective section view of a push rod, a trephine, a bushing of the cutting guide assembly of FIG. 3A and a partially formed plug.

A cutting guide assembly 90 may be configured to facilitate forming of an osteochondral plug 40' with enhanced geometrical features, such as diameter, length, cartilage surface contour, and cartilage surface orientation reference. Additionally, or alternatively, the cutting guide assembly 90 may be configured to facilitate forming of the osteochondral plug 40' from larger tissue grafts that may be removed from a larger body of tissue and may include autograft, allograft, xenograft, other biological materials, synthetic materials, and/or combinations thereof. The tissue grafts may be removed from the larger body of tissue prior to positioning the tissue graft on the cutting guide assembly 90.

The cutting guide assembly 90 may include a cutting guide 100, a trephine 140, a guide sleeve 160, a thumbscrew 180, a bushing 190, and a graft plug 10 as shown in FIG. 1. The graft plug 10 may include allograft, autograft, other biological materials, synthetic materials, and/or combinations thereof. The graft plug 10 may have a cartilage portion 12, a bone portion 14, and a cartilage surface 16. The graft plug 10 may define a bottom surface and a top surface containing the cartilage surface 16. The top surface may be non-perpendicular to a cutting direction of the trephine 140 and/or other graft cutter. The trephine 140 may include a trephine bore 150 configured to receive the osteochondral plug.

The cutting guide 100 may be configured to securely receive a graft plug 10 and facilitate cutting of the graft plug to form an osteochondral plug 40' with enhanced geometrical features. The cutting guide 100 may include one or more surfaces configured to guide a cutting tool to facilitate cutting the graft plug 10 at a predetermined length and/or angle. The cutting guide 100 may further include a receptacle configured to receive a guide sleeve 160 at predetermined angles relative to an axis of the graft plug 10.

The cutting guide 100 may include a base 106, a body 102, and a plug cutting guide 104, which may be in the form of a clamp, such that the body 102 and the plug cutting guide 104 extend from the base 106. The plug cutting guide 104 may include a first clamp arm 108 and a second clamp arm 110 that are separated by first slot 120. In one embodiment, the plug cutting guide 104 and the base 106 may be separated by a second slot 122. The thumbscrew 180 may have a knob 184 on a proximal end of the thumbscrew 180 and may have external threads 182 extending from the knob 184 to a distal end of the thumbscrew 180. The second clamp arm 110 may have a hole 112 for slidingly receiving the external threads 182 of the thumbscrew 180. The first clamp arm 108 may have a threaded hole 114 for engaging the external threads 182 of the thumbscrew 180. Thus, when the knob 184 contacts a surface adjacent to the hole 112 and the external threads 182 are engaged and advanced in the threaded hole 114, the first clamp arm 108 and the second clamp arm 110 may be urged towards each other, thereby reducing the size of a registration surface 128 which may cause the graft plug 10, located in the registration surface 128, to be secured to the cutting guide 100. The registration surface 128 may have a reference shape that corresponds to a shape of at least part of a shaped surface 48.

The guide sleeve 160 may have the fins 166 and the reference surface 174 and may be positioned in the cutting guide 100 by engaging the fins 166 with the second slot 122 of the cutting guide 100. Then, the reference surface 174 may facilitate location of the graft plug 10 within the registration surface 128 by placement of the cartilage surface 16 of the graft plug 10 into contact with the reference surface 174 of the guide sleeve 160. The registration surface 128 may be shaped to match an external wall of the graft plug 10.

The guide sleeve 160 may be configured to be received in a cutting guide at a predetermined angle. The guide sleeve 160 may include a cannulation configured to slidably receive a cutting tool. The guide sleeve 160 may facilitate creation of a partially formed plug 40 at the predetermined angle from a graft plug 10.

The guide sleeve 160 may have a proximal end 162, a distal end 164, a flange 170 formed on the proximal end 162, one or more fins 166 extending from the flange 170 to the distal end 164, and a cannulation 168 extending through the guide sleeve 160 from the proximal end 162 to the distal end 164. The reference surface 174 may extend from the flange 170 to the distal end 164. The reference surface 174 may be planar. An arrow 172 may be located on a surface of the flange 170 and may point to one of the one or more fins 166.

The body 102 of the cutting guide 100 may have a plurality of angled slots 118, oriented at different angles, and an angle scale 116, thereby creating a discrete number of cutting directions. The guide sleeve 160 may be coupled to the cutting guide 100 by inserting a fin 166 into one slot of the plurality of angled slots 118. The cutting guide 100 may have a first receptacle 124 and a second receptacle 126, and both receptacles may be adapted for receiving the guide sleeve 160. The guide sleeve 160 may be positioned in the second receptacle 126 as shown in FIG. 2A, such that one or more fins 166 engage the second slot 122 to place a reference surface 174 of the guide sleeve 160 into a desired position relative to a registration surface 128 located in the plug cutting guide 104.

The graft plug 10 may be advanced into the registration surface 128 until the cartilage surface 16 may be in direct contact with the reference surface 174 of the guide sleeve 160, then the external threads 182 on the thumbscrew 180 may be threadingly advanced in the threaded hole 114 of the cutting guide 100, causing the plug cutting guide 104 to clamp the graft plug 10 and thereby securing the graft plug 10 to the cutting guide 100. Additionally, or alternatively, the saw blade 210 may be guided by surfaces on the first clamp arm 108 and/or the second clamp arm 110 to trim the length of the graft plug 10 as shown in FIG. 2B.

After the previously described operation of securing the graft plug 10 to the cutting guide 100, the guide sleeve 160 may be positioned in the first receptacle 124 by engaging the one or more fins 166 with at least one of the plurality of angled slots 118 and/or by abutting the flange 170 against an outer surface of the body 102 as shown in FIGS. 3A and 3B. When the guide sleeve 160 is thus positioned, the arrow 172 may point to the angle scale 116 to indicate a predetermined angled position between the guide sleeve 160 and the cartilage surface 16 of the graft plug 10.

The bushing 190 may have an external diameter 192 and a resilient member 194, and may be inserted into a trephine bore 150 of the trephine 140, such that the resilient member 194 provides a light friction fit with the trephine bore 150 and the external diameter 192 provides a close sliding fit with the trephine bore 150. The trephine 140 may have a proximal end 142, a distal end 144, a longitudinal axis 141 extending between the proximal end 142 and the distal end 144, and a drive end 148 located near proximal end 142. A proximal bore 154 may extend from the proximal end 142 to the internal threads 152, and the internal threads 152 may extend between the proximal bore 154 and the trephine bore 150. The cutting teeth 146 may be located on the distal end 144 of the trephine 140. The cutting teeth 146 may be a single cutting tooth (not shown), multiple cutting teeth of the same geometry (as shown), or multiple cutting teeth of varying geometry (not shown).

As shown in FIGS. 3A and 3B, the trephine 140, with the bushing 190 inserted in the trephine bore 150, may then be guided into the guide sleeve 160 and may be rotated and advanced with a cutting direction along the longitudinal axis 141 of the trephine 140 and may cut an external shaped surface 48 on the graft plug 10 thus forming a partially formed plug 40 having a bone portion 44 corresponding to the bone portion 14, a cartilage portion 42 corresponding to the cartilage portion 12, a plug surface 46 corresponding to the cartilage surface 16, and a newly formed shaped surface 48, wherein the shaped surface 48 may have a longitudinal axis 41.

The partially formed plug 40 may have a plug surface angle α, which may be an angle measured between a plane perpendicular to the longitudinal axis 41 and the plug surface 46.

The guide sleeve 160 may be positioned relative to the cartilage surface 16 through positioning and securing of the guide sleeve 160 within the first receptacle 124 and securing the graft plug 10 within the registration surface 128. The plug surface angle α may correspond to a value on the angle scale 116 indicated by the arrow 172 when the guide sleeve 160 is positioned in the first receptacle 124 as previously described.

The guide sleeve 160 may be positioned so that the plug surface angle α may correspond to a surface angle of tissue needed at a graft recipient site. The angle scale 116 may include a discrete number of cutting direction angles displaced from each other by an angular offset. The guide sleeve 160 may be coupled to the cutting guide 100 such that the guide sleeve 160 extends along the longitudinal axis 141.

The partially formed plug 40 may include an external wall, or shaped surface 48, that may connect a top surface, or plug surface 46 to a bottom surface, or planar surface 50. The external wall may be generally parallel to the longitudinal axis 141 and transverse to the top surface and the bottom surface. The term "transverse" is herein defined as an angle relative to the longitudinal axis 141 between 20 degrees and 90 degrees, inclusive. The graft plug 10 may be oriented within the registration surface 128 so that, relative to the bottom surface and/or the external wall, the cutting direction may be selected so that the top surface may be oriented at the plug surface angle α. The plug surface angle α may be complementary to an angle transverse to the longitudinal axis 141. The angle between the external wall, or shaped surface 48, and the longitudinal axis 141 may be between 20 and 90 degrees as set forth above, including any angular increment within that range, including but not limited to 25 degrees, 30 degrees, 35 degrees, 45 degrees, 50 degrees, 55 degrees, 60 degrees, 65 degrees, 70 degrees, 75 degrees, 80 degrees, and 85 degrees.

A push rod 200 may be configured to facilitate removal of the partially formed plug 40 from the trephine bore 150 of the trephine 140 after the trephine 140 separates the partially formed plug 40 from the graft plug 10, as previously described. As shown in FIG. 4, the push rod 200 may be provided having a proximal end 202, a distal end 204, a drive end 206 located near the proximal end 202, and external threads 208 extending from the drive end 206 to the distal end 204 of the push rod 200. The external threads 208 may be configured to engage the internal threads 152 of the trephine 140 so that the distal end 204 of the push rod 200 may abut an opposing surface of the bushing 190, and may thereby urge the bushing 190 towards the distal end 144 of the trephine 140 and thereby may expel the partially formed plug 40 from the trephine 140.

A cutting guide assembly 290 may be configured to facilitate forming of an osteochondral plug 40' with enhanced geometrical features, such as diameter, length, cartilage surface contour, and cartilage surface orientation reference. Additionally, or alternatively, the cutting guide assembly 290 may be configured to facilitate forming of the osteochondral plug 40' from larger tissue grafts that may be removed from a larger body of tissue and may include autograft, allograft, xenograft, other biological materials, synthetic materials, and/or combinations thereof.

A surface angle of tissue at the graft recipient site may be measured and the top surface of the formed osteochondral plug 40' may be formed such that the top surface may correspond to the measured surface angle. The formed osteochondral plug 40' may be placed into the graft recipient site 500 such that the top surface may generally align with surrounding tissue.

Figure 5:
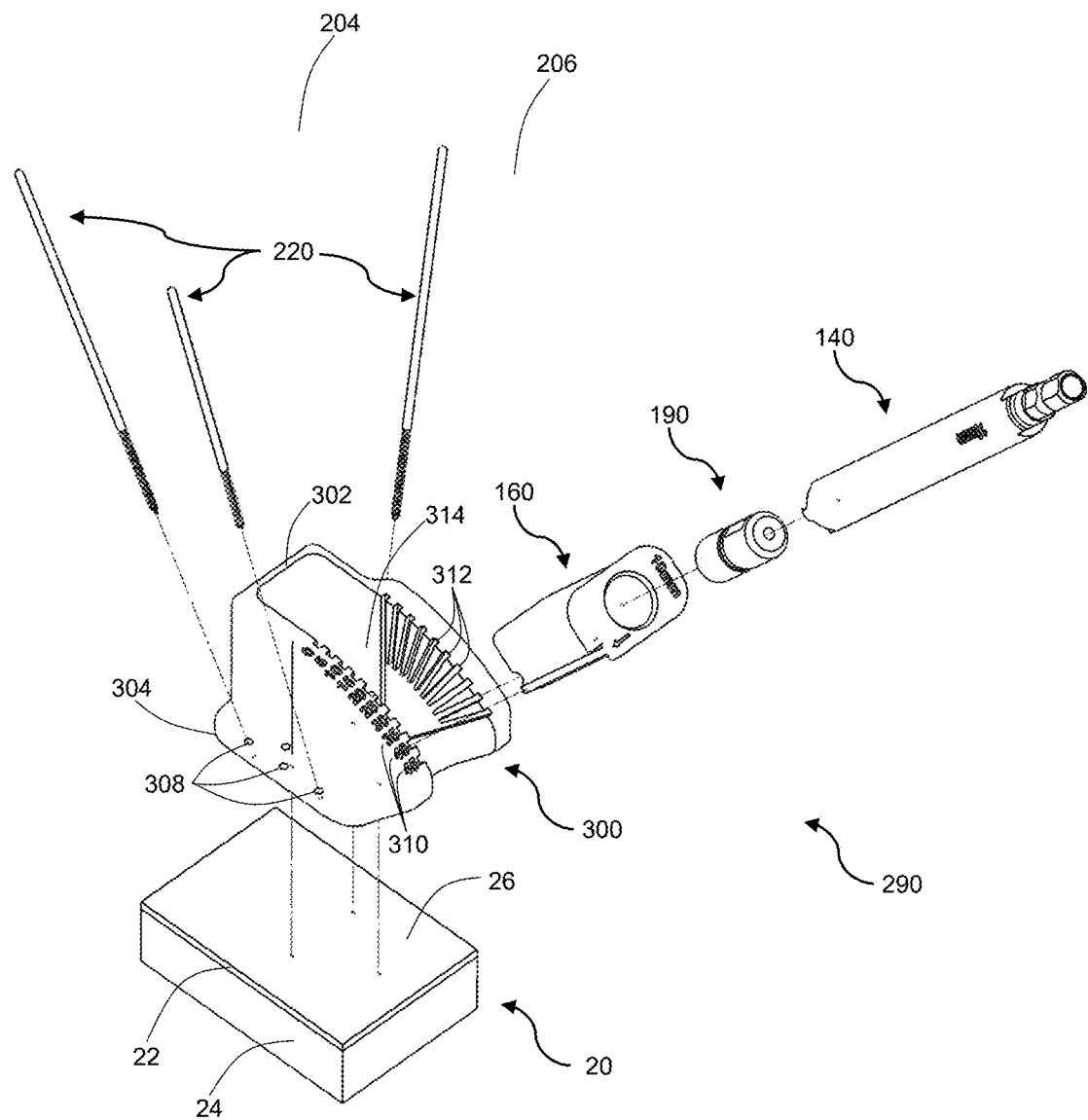
FIG. 5 is an exploded perspective view of a cutting guide assembly according to an embodiment of the present disclosure.

FIG. 5 is an exploded perspective view of the cutting guide assembly 290 according to an embodiment of the present disclosure. FIG. 6A a front view of the cutting guide assembly 290 shown in FIG. 5. FIG. 6B is a side sectional view of the cutting guide assembly 290 shown in FIG. 6A. FIG. 7 is perspective section view of a push rod 200, a trephine 140, a bushing 190 of the cutting guide assembly 290 of FIG. 6A and a partially formed plug 60.

The cutting guide assembly 290 may include a cutting guide 300, a trephine 140, a guide sleeve 160, at least one pin 220, a bushing 190, and a bulk graft 20 as shown in FIG. 5. The bulk graft 20 may include allograft, autograft, other biological materials, synthetic materials, or combinations thereof. The bulk graft 20 may have a cartilage portion 22, a bone portion 24, and a cartilage surface 26. The bulk graft 20 may include a generally flat surface configured to abut a surface of the cutting guide 300. The bulk graft 20 have a generally cuboidal shape. Alternatively, the bulk graft 20 may have any three-dimensional shape having at least one generally flat surface.

The cutting guide 300 may include a base 304, a body 302 extending from the base 304, and one or more feet 306. The cutting guide 300 may have a plurality of angled slots 312 formed on the body 302, and an angle scale 310 adjacent one side of the plurality of angled slots 312. The body 302 may have a receptacle 314 adapted to receive the guide sleeve 160 and one or more pin holes 308 to receive the at least one pin 220. In one embodiment, the one or more feet 306 may include three feet that are hemispherical in shape and may extend away from the base 304. The distal tips of the one or more feet 306 may lie in a plane which defines a reference plane or reference surface on the cutting guide 300. The cartilage surface 26 of the bulk graft 20 may be abutted against the one or more feet 306 and the at least one pin 220 may be placed through the one or more pin holes 308 and into the bulk graft 20 to secure the bulk graft 20 to the cutting guide 300 so that at least one of the plurality of angled slots 312 is in a predetermined position and orientation with respect to the cartilage surface 26.

The guide sleeve 160 may be positioned in the receptacle 314 by engaging the one or more fins 166 with at least one of the plurality of angled slots 312 and by abutting the flange 170 against an outer surface of the body 302 as shown in FIGS. 6A and 6B. When the guide sleeve 160 is thus positioned, the arrow 172 may point to the angle scale 310 to indicate a predetermined angled position between the guide sleeve 160 and the reference plane defined by the one or more feet 306 as previously described.

As shown in FIGS. 6A and 6B, the trephine 140 with the bushing 190 inserted in the trephine bore 150 may be then placed into the guide sleeve 160 and may be rotated and advanced along a longitudinal axis 141 of the trephine 140 to cut an external diametrical surface from the bulk graft 20 thus forming a partially formed plug 60 having a bone portion 64 corresponding to bone portion 24, a cartilage portion 62 corresponding to cartilage portion 22, a plug surface 66 corresponding to cartilage surface 26, and a newly formed cylindrical surface 68, wherein the cylindrical surface 68 may have a longitudinal axis 61. The formed plug 60 may have a plug surface angle β, which may be an angle measured between a plane perpendicular to the longitudinal axis 61 and the plug surface 66. The plug surface angle β may be complementary to an angle transverse to the longitudinal axis 61.

The guide sleeve 160 may be positioned relative to the cartilage surface 26 through positioning and securing of the guide sleeve 160 within the receptacle 314 and securing cutting guide 300 to the bulk graft 20. The plug surface angle β may correspond to a value on the angle scale 310 indicated by the arrow 172 when the guide sleeve 160 is positioned in the receptacle 314 as previously described.

A push rod 200 may be configured to facilitate removal of the partially formed plug 60 from the trephine bore 150 of the trephine 140 after the trephine 140 separates the partially formed plug 60 from the bulk graft 20, as previously described. As shown in FIG. 7, the distal end 204 of push rod 200 may abut an opposing surface of the bushing 190, and may thereby urge the bushing 190 towards the distal end 144 of the trephine 140 and thereby may expel the partially formed plug 60 from trephine 140.

A method for predetermining a value for α and/or β may include a step of using a trial at a desired anatomic recipient site for the formed plug 40 and/or the formed plug 60 to determine the angle (or other topography) of the anatomic surface at the graft recipient site, and then replicating that angle (or other topography) on the graft plug 10 or the bulk graft 20 by inserting the trial into a receptacle of the cutting guide 100 and/or cutting guide 300 and using the cutting guide 100 and/or the cutting guide 300, respectively. The osteochondral plug may be inserted into the cutting guide 100 and/or cutting guide 300 so that the top surface of the osteochondral plug lies along the trial surface. A second cutter, such as a saw blade 210, may then be guided along a planar guide surface of the cutting guide 100 and/or cutting guide 300 creating a new bottom surface. Such a method of trialing an anatomic surface topography at a desired anatomic recipient site is described in U.S. Pat. No. 11,660,194, which is incorporated herein by reference.

Figure 8:
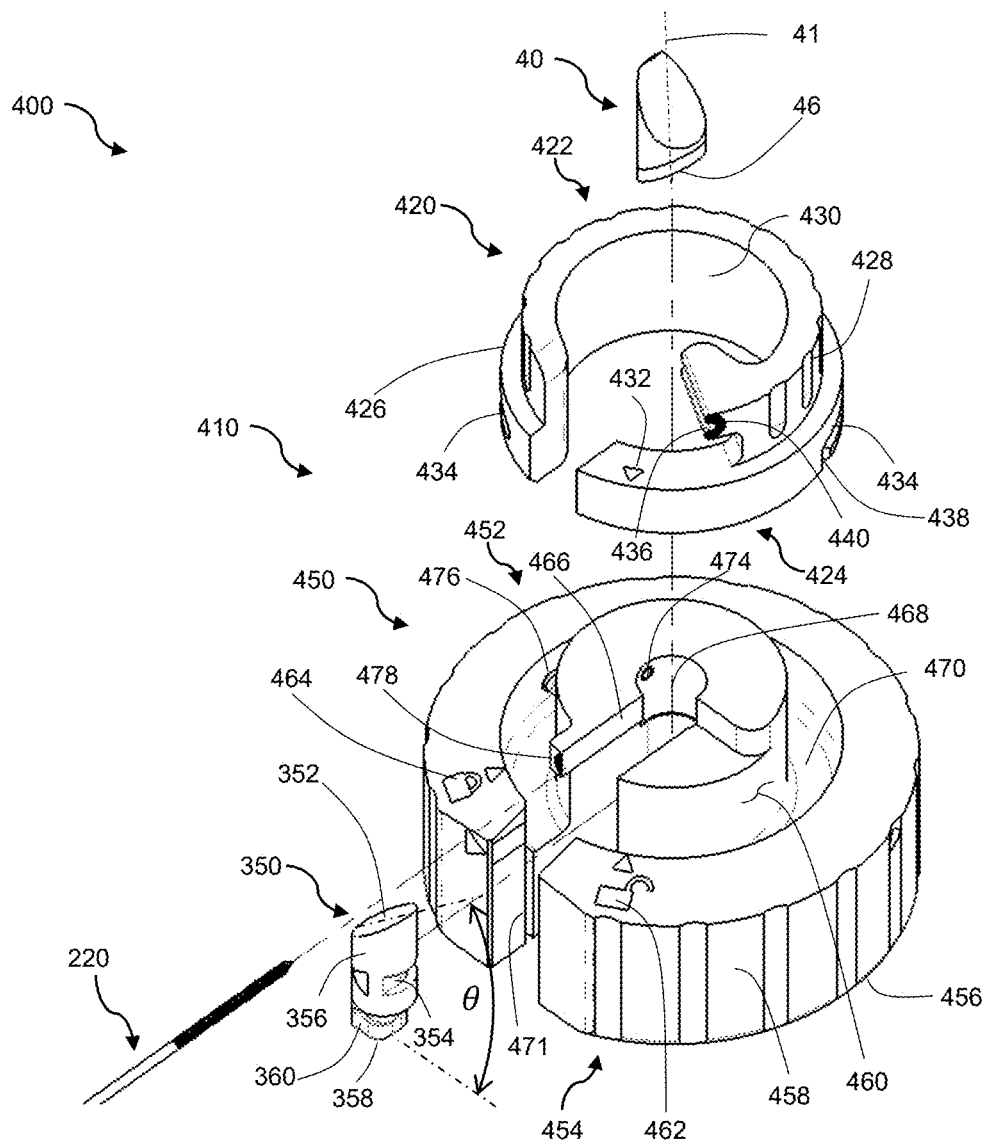
FIG. 8 an exploded perspective view of a cutting guide assembly according to an embodiment of the present disclosure.
Figure 9:
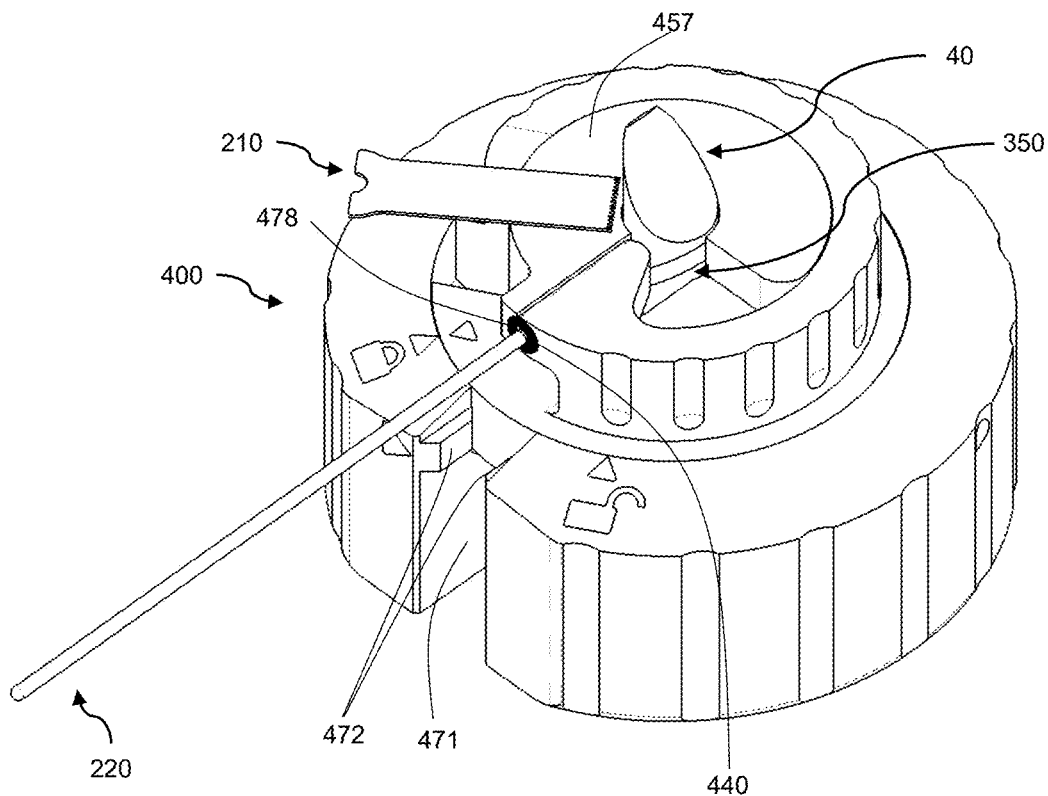
FIG. 9 is a perspective view of the cutting guide assembly of FIG. 8, and a saw blade.
Figure 10:
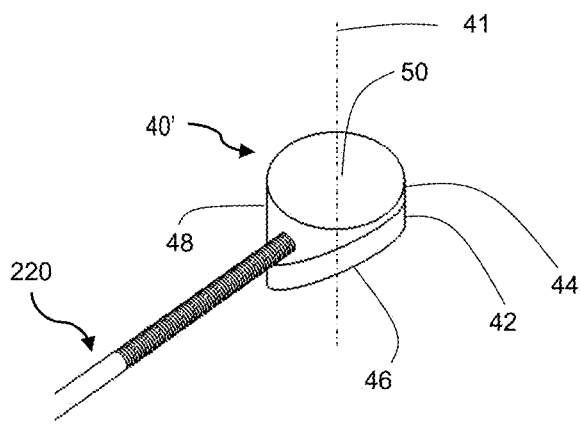
FIG. 10 is a perspective view of a pin of the cutting guide assembly of FIG. 8 and an osteochondral plug.
Figures 11A, 11B:
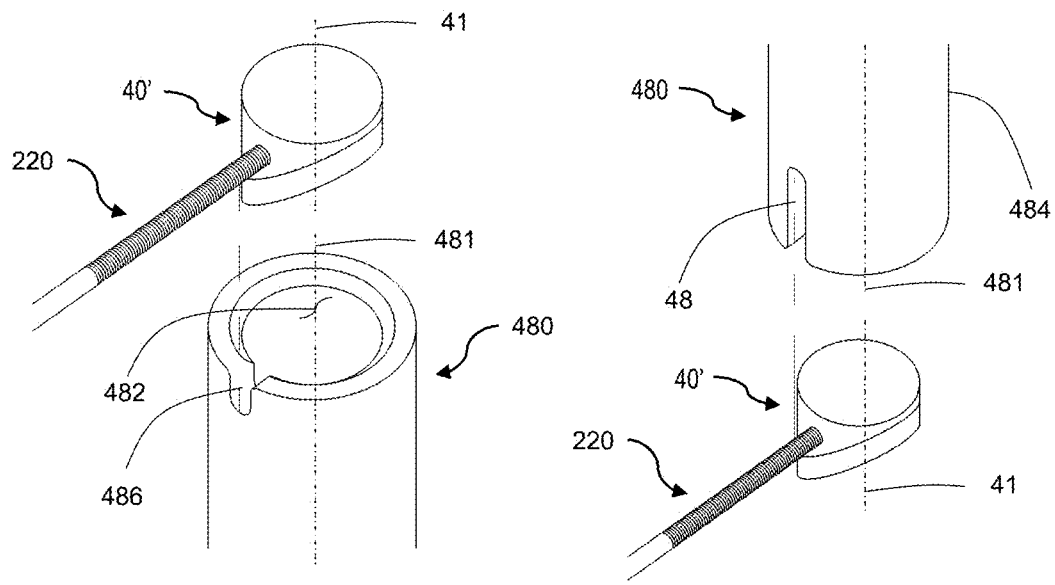
FIG. 11A is an exploded perspective view of the pin of FIG. 10 inserted into an osteochondral plug and a delivery tube according to an embodiment of the present disclosure.
FIG. 11B is an exploded perspective view of the pin of FIG. 10 inserted into an osteochondral plug and a delivery tube according to an embodiment of the present disclosure.

FIG. 8 an exploded perspective view of a cutting guide assembly 400 according to an embodiment of the present disclosure. FIG. 9 is a perspective view of the cutting guide assembly 400 of FIG. 8, and a saw blade 210. FIG. 10 is a perspective view of a pin 220 of the cutting guide assembly 400 of FIG. 8 and a formed plug 40. FIG. 11A is an exploded perspective view of the pin 220 of FIG. 10 inserted into a formed plug 40 and a delivery device 480 according to an embodiment of the present disclosure. FIG. 11B an exploded perspective view of the pin 220 of FIG. 10 inserted into a formed plug 40 and a delivery device 480 according to an embodiment of the present disclosure.

A cutting guide assembly 400 may be configured to facilitate forming of an osteochondral plug 40' with enhanced geometrical features, such as diameter, length, cartilage surface contour, and cartilage surface orientation reference. Additionally, or alternatively, the cutting guide assembly 400 may be configured to facilitate additional forming of the osteochondral plug 40' from a partially formed plug 40 comprised of autograft, allograft, xenograft, other biological materials, synthetic materials, or combinations thereof.

As shown in FIG. 8, a cutting guide assembly 400 may include a cutting guide 410, a partially formed plug 40, a trial tip 350, and the pin 220. The cutting guide 410 may include a guide base 450 and a lock ring 420. The guide base 450 may include a proximal end 452, a distal end 454, a bottom 456 formed on the distal end 454, a grip ring 458 extending from the bottom 456 towards the proximal end 452, a central post 460, a top surface 457 formed on the proximal end 452 of central post 460, a plug receptacle 468 formed inside central post 460, a trial tip receptacle 471 that may communicate with the plug receptacle 468, a resilient member 474 located in the plug receptacle 468, a lock ring receptacle 470 extending from the proximal end 452 towards the distal end 454, and a post 476 located in the lock ring receptacle 470.

A second post (not shown) similar to post 476 may be located in the lock ring receptacle 470, radially spaced apart from the post 476. A pin wall 466 may extend distally from the top surface 457 and a pin hole mark 478 may be located at one end of the pin wall 466. An unlocked mark 462 and a locked mark 464 may be formed on a proximal facing surface of the guide base 450.

The lock ring 420 may have a proximal end 422, a distal end 424, a base 426 located near the distal end 424, a grip ring 428 located near the proximal end 422, an internal bore 430, a pin groove 436 formed on the grip ring 428, a circumferential groove 434 formed on the base 426, an arrow 432 located on a proximal facing surface of base 426, and a pin hole mark 440 formed on a surface of the grip ring 428 at one end of the pin groove 436. A slot 438 may communicate with the circumferential groove 434 and may extend to the distal end 424 of the lock ring 420. A second slot (not shown) similar to slot 438 may communicate with circumferential groove 434 and may be radially spaced apart from slot 438. The lock ring 420 may be assembled to the guide base 450 by moving in a proximal to distal motion with the arrow 432 aligned with the unlocked mark 462, thereby engaging the slot 438 and/or the second slot (not shown), with the second post (not shown) and/or the post 476, respectively. With the post 476 and the second post (not shown) positioned in the circumferential groove 434, the lock ring 420 may be rotated clockwise until the arrow 432 aligns with the locked mark 464. The pin hole mark 440 may then abut the pin hole mark 478 and the pin wall 466 may abut the pin groove 436, thereby bounding a passageway to guide insertion of the pin 220 into the partially formed plug 40 (or partially formed plug 60).

As shown in FIG. 8, the trial tip 350 may have a bottom surface datum 358, a side surface datum 360, a slot 354, a trial surface 352, an outer diameter 356 that is similar in size to the shaped surface 48, and a trial surface angle θ measured between the bottom surface datum 358 and the trial surface 352. The side surface datum 360 may be parallel to a plane of symmetry (not shown) that intersects the trial surface 352. The side surface datum 360 may be perpendicular to the bottom surface datum 358.

The trial tip 350 may be provided in multiple configurations, each with a different trial surface angle θ. Trial tip 350 may be connected to a handle (not shown) for easier manipulation. One of multiple configurations of a trial tip 350 may be selected so that trial surface angle θ matches the plug surface angle α on the formed plug 40. Similarly, the partially formed plug 60 may be substituted for the partially formed plug 40, in which case a trial tip 350 may be selected so that trial surface angle θ matches plug surface angle β on the partially formed plug 60.

In FIG. 9, the trial tip 350 may be positioned in the trial tip receptacle 471 of the guide base 450 by engaging the slot 354 on the trial tip 350 with the rails 472 located on the side walls of the trial tip receptacle 471. The partially formed plug 40 may be positioned in the plug receptacle 468 by abutting the plug surface 46 against the trial surface 352. Similarly, the partially formed plug 60 may be positioned in the plug receptacle 468 by abutting the plug surface 66 against the trial surface 352.

With the partially formed plug 40 and/or the partially formed plug 60 thus positioned, and with the pin 220 inserted into the partially formed plug 40 and/or the partially formed plug 60, as previously described, the pin 220 may be positioned so that it may be perpendicular to the side surface datum 360 and parallel to the bottom surface datum 358. Thus, the pin 220 may serve as an orientation reference relative to the plug surface 46 (or the plug surface 66), which may correlate to the orientation of the trial surface 352 due to the previously described abutment of the trial surface 352 and the plug surface 46 (or the plug surface 66). Additionally, or alternatively, other orientation references may be used. For example, a vertical line perpendicular to the bottom surface datum 358 may be marked or scribed on an outer surface of the formed plug 40 and may pass through the location where the pin 220 enters into the formed plug 40.

An osteochondral plug orientation reference, such as the scribed line, may be used to align the osteochondral plug with a delivery device orientation reference, such as the pin 220, to determine an orientation of the osteochondral plug. The delivery device orientation reference and/or the osteochondral plug orientation reference may be used to insert the osteochondral plug into the recipient site at the orientation of the osteochondral plug.

As shown in FIG. 9, with the lock ring 420 rotated into the locked position as previously described, and with the pin 220 inserted into the partially formed plug 40 as previously described, the saw blade 210 may be guided by the top surface 457 to trim the partially formed plug 40 to a predetermined length thereby transforming the partially formed plug 40 into a formed osteochondral plug 40'. Additionally, or alternatively, the saw blade 210 may be guided by geometrical features other than a top surface, such as a set of parallel surfaces, pins, or other features that would bound a plane or a set of parallel planes.

Additionally, or alternatively, with the lock ring 420 rotated into the locked position as previously described, and with the pin 220 inserted into the partially formed plug 60 as previously described, the saw blade 210 may be guided by the top surface 457 to trim the partially formed plug 60 to a predetermined length thereby transforming the partially formed plug 60 into a formed plug (not shown). Additionally, or alternatively, the saw blade 210 may be guided by geometrical features other than a top surface, such as a set of parallel surfaces, pins, or other features that would bound a plane or a set of parallel planes.

A delivery device 480 may be configured to facilitate delivery of an osteochondral plug 40' into an anatomic recipient site. The delivery device 480 may have an inner bore 482, and outer diameter 484. The inner bore 482 and the outer diameter 484 may be concentric, and both the inner bore 482 and the outer diameter 484 may extend along a longitudinal axis 481. A slot 486 may extend longitudinally along the longitudinal axis 481 and the slot 486 may extend radially from the inner bore 482 to the outer diameter 484.

FIGS. 11A and 11B show how the pin 220 may be used as an orientation reference to position the formed osteochondral plug 40' into the delivery device 480 so that the plug surface 46 may have a predetermined orientation within the delivery device 480. This may be accomplished by inserting the formed osteochondral plug 40' into the inner bore 482 with the pin 220 aligned with the slot 486. The slot 486 may serve as an orientation reference on delivery device 480, just as the pin 220 may serve as an orientation reference on the formed osteochondral plug 40'.

The formed osteochondral plug 40' may be inserted into the delivery device 480. The delivery device 480 may be aligned with a graft recipient site and the formed osteochondral plug 40' may be moved from the delivery device 480 to the graft recipient site. The push rod 200 may be used to urge the formed osteochondral plug 40' from the delivery device 480. The formed osteochondral plug 40' may be inserted into the graft recipient site 500 along an antegrade direction. Alternatively, the formed osteochondral plug 40' may be inserted into the graft recipient site 500 along a retrograde direction. Additionally, or alternatively, the formed osteochondral plug 40' may be inserted into the graft recipient site 500 along an antegrade delivery direction that is non-perpendicular to the top surface, or plug surface 46.

The formed osteochondral plug 40' may be positioned in the delivery device 480 and the pin 220 may be removed from the formed osteochondral plug 40' to facilitate delivery of the formed osteochondral plug 40' to a desired anatomic recipient site 500. FIG. 11A shows positioning of the formed osteochondral plug 40' in the delivery device 480 to facilitate an antegrade delivery of the formed osteochondral plug 40' to a desired anatomic recipient site. FIG. 11B shows positioning of the formed osteochondral plug 40' in the delivery device 480 to facilitate a retrograde delivery of the formed osteochondral plug 40' to a desired anatomic recipient site.

Figures 12A, 12B:
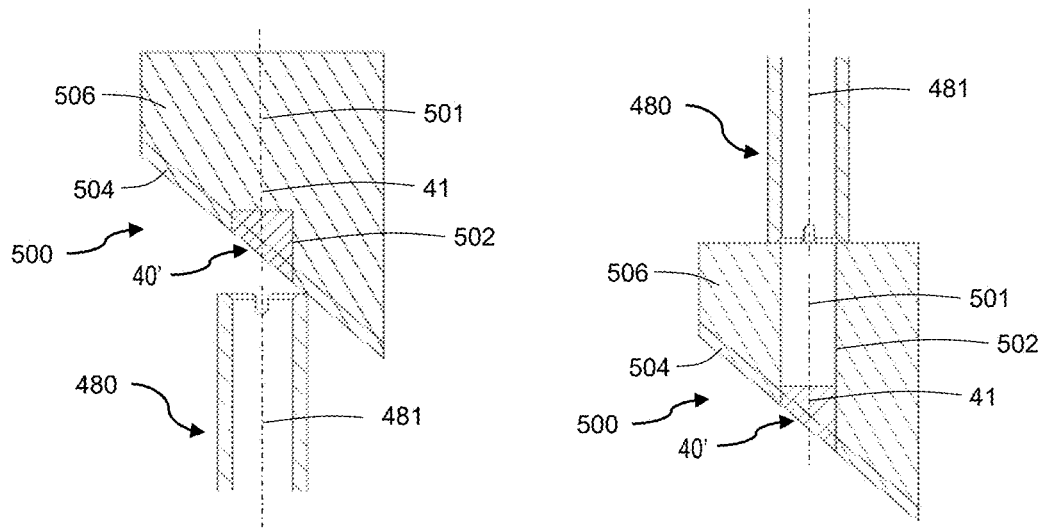
FIG. 12A is a side section view depicting the transfer of an osteochondral plug from a delivery tube into an anatomic recipient site in an antegrade direction.
FIG. 12B is a side section view depicting the transfer of an osteochondral plug from a delivery tube into an anatomic recipient site in a retrograde direction.

FIG. 12A depicts the transfer of the formed osteochondral plug 40' from a delivery device 480 into an anatomic recipient site 500 in an antegrade direction. The longitudinal axis 481 of the delivery device 480 may be aligned with a longitudinal axis 501 of a bore 502 located at a recipient site 500 having a cartilage portion 504 and a bone portion 506. The delivery device 480 may be located just outside the cartilage portion 504, and then the formed osteochondral plug 40' may be transferred from the delivery device 480 to the recipient site 500 in an antegrade direction such that bone portion 44 may align with the bone portion 506 and the cartilage portion 42 may align with the cartilage portion 504.

FIG. 12B depicts the transfer of the formed osteochondral plug 40' from a delivery device 480 into an anatomic recipient site 500 in a retrograde direction. The longitudinal axis 481 of the delivery device 480 may be aligned with the longitudinal axis 501 of the recipient site 500. The delivery device 480 may be located just outside the bone portion 506, and the formed osteochondral plug 40' may be transferred from the delivery device 480 to the recipient site 500 in a retrograde direction such that the bone portion 44 may align with the bone portion 506 and the cartilage portion 42 may align with the cartilage portion 504.

Figure 13:
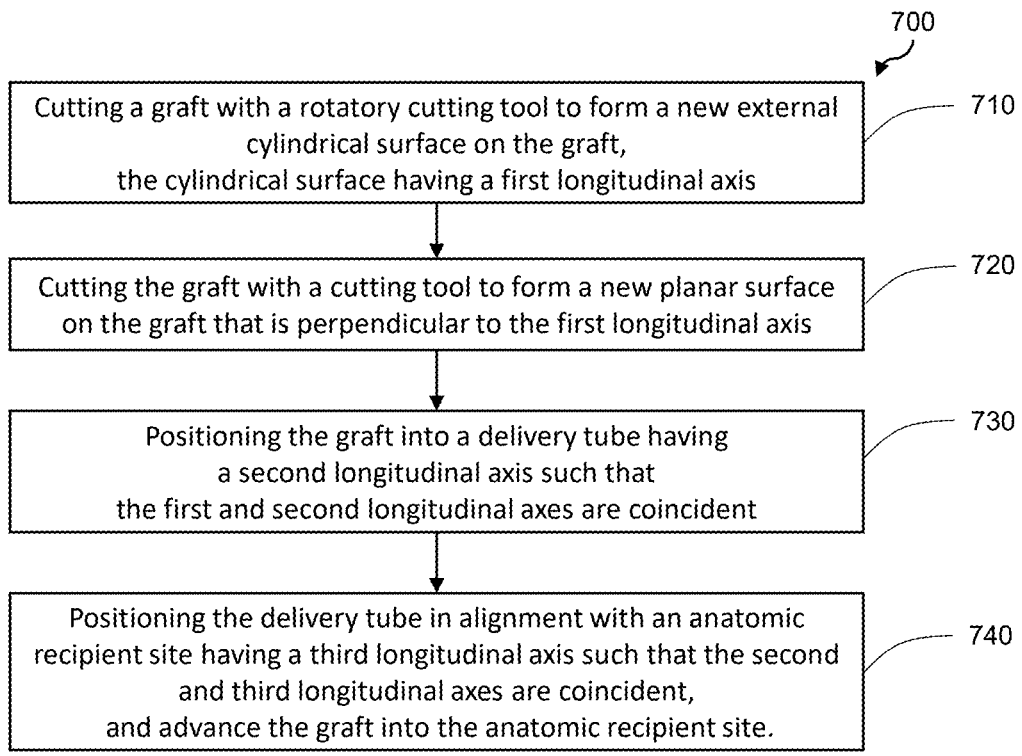
FIG. 13 is a flow chart showing a method of shaping a graft and delivering the shaped graft to an anatomic recipient site according to an embodiment of the present disclosure.

FIG. 13 is a flow chart showing a method of shaping a graft and delivering the shaped graft to an anatomic recipient site. A method 700 may include a step 710 of cutting a graft (such as graft plug 10 or bulk graft 20) with a rotary cutter (such as trephine 140) to form a new external surface on the graft having a first longitudinal axis (such as shaped surface 48 and longitudinal axis 41 of partially formed plug 40, or cylindrical surface 68 and longitudinal axis 61 of partially formed plug 60). Method 700 may further include a step 720 of cutting the graft with a cutting tool (such as saw blade 210) to form a new planar surface (such as planar surface 50 on formed osteochondral plug 40'). The new planar surface may be perpendicular to the first longitudinal axis. Additionally, or alternatively, the new planar surface may be generally opposite the cartilage surface.

Method 700 may further include a step 730 of positioning the graft into a delivery tube (such as delivery device 480) having a second longitudinal axis (such as longitudinal axis 481) such that the first and second longitudinal axes may be coincident. Method 700 may further include a step 740 of positioning the delivery tube in alignment with an anatomic recipient site (such as recipient site 500) having a third longitudinal axis (such as longitudinal axis 501) such that the second and third longitudinal axes may be coincident and advancing the graft into the anatomic recipient site.

Figure 14:
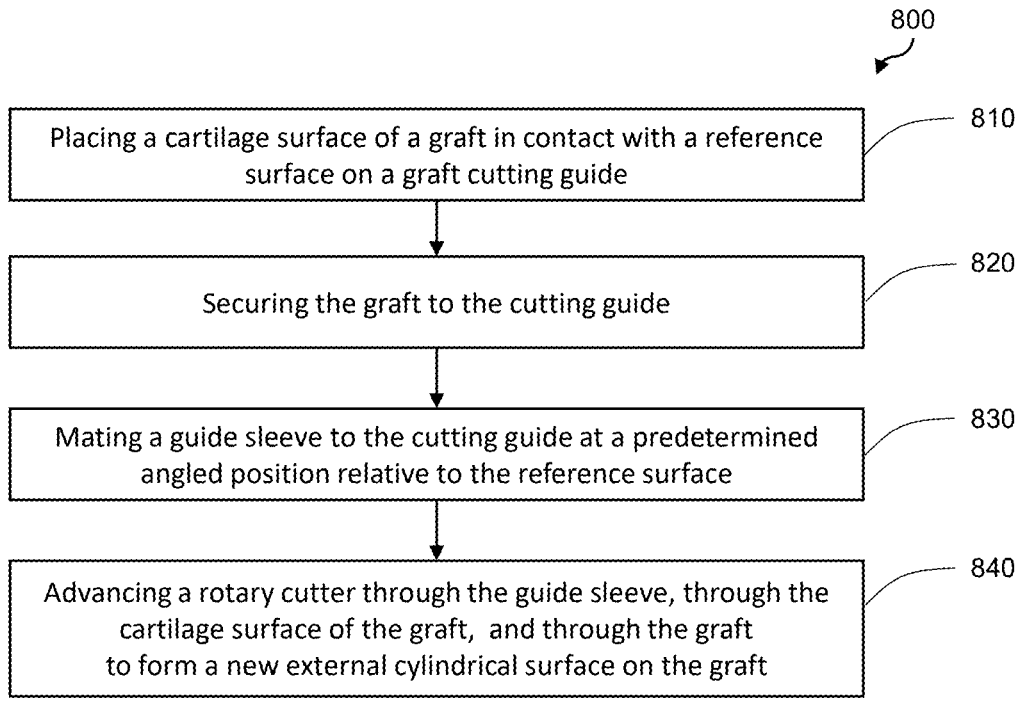
FIG. 14 is a flow chart showing a method of using a graft cutting guide to form a new external surface on a graft according to an embodiment of the present disclosure.

FIG. 14 is a flow chart showing a method of using a graft cutting guide to prepare a new external surface on a graft, according to one embodiment. A method 800 may include a step 810 of placing a cartilage surface of a graft (such as cartilage surface 16 or cartilage surface 26) in contact with a reference surface (such as reference surface 174 or a reference plane defined by the three distal tips of the one or more feet 306) on a graft cutting guide (such as the cutting guide assembly 90 or the cutting guide assembly 290). Method 800 may further include a step 820 of securing the graft to the cutting guide.

Method 800 may further include a step 830 of mating a guide sleeve (such as guide sleeve 160) to the cutting guide at a predetermined angled position relative to the reference surface or reference plane. Method 800 may further include a step 840 of advancing a rotary cutter (such as trephine 140) through the guide sleeve, through the cartilage surface of the graft (such as cartilage surface 16 on graft plug 10 or cartilage surface 26 on graft plug 20), and through the graft to form a new external cylindrical surface on the graft (such as shaped surface 48 on formed plug 40 or cylindrical surface 68 on formed plug 60).

Figure 15:
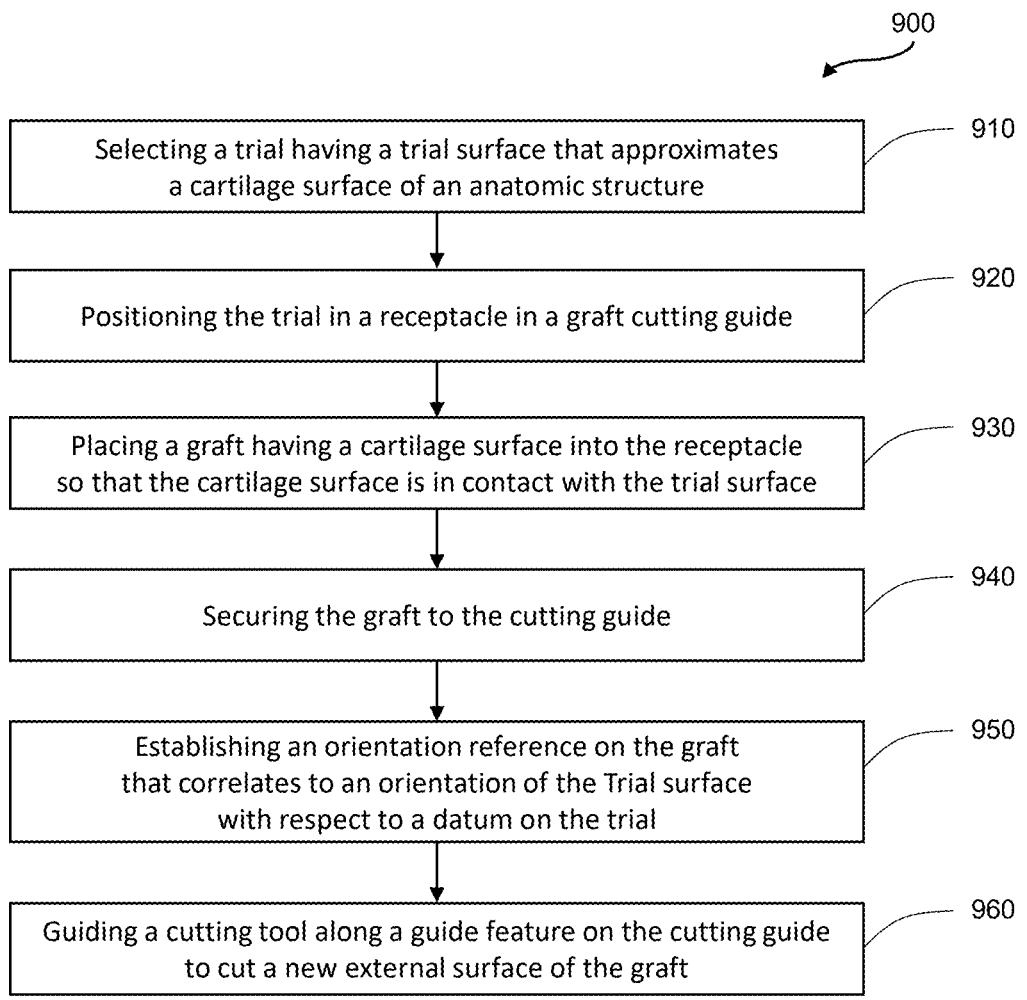
FIG. 15 is a flow chart showing a method of using a trial and a graft cutting guide to form a new external surface on a graft according to an embodiment of the present disclosure.

FIG. 15 is a flow chart showing a method of using a trial and a graft cutting guide to prepare a new external surface on a graft, according to one embodiment. A method 900 may include a step 910 of selecting a trial (such as trial tip 350) having a trial surface (such as trial surface 352) that approximates an anatomic structure cartilage surface (such as a surface of cartilage portion 504). Method 900 may further include a step 920 of positioning the trial in a receptacle (such as trial tip receptacle 471) in a graft cutting guide (such as cutting guide 410).

Method 900 may further include a step 930 of delivering a graft having a cartilage surface into a receptacle (such as plug receptacle 468) so that the cartilage surface is in contact with the trial surface (such as trial tip 350). Method 900 may further include a step 940 of securing the graft to the cutting guide. Method 900 may further include a step 950 of establishing an orientation reference on the graft that correlates to an orientation of the trial surface with respect to a datum on the trial. Method 900 may further include a step 960 of guiding a cutting tool along a guide feature on the cutting guide to cut an external surface of the graft. The guide feature may be one of a planar surface or a pair of opposed planar surfaces.

Those of skill in the art will recognize that this is only one of many potential methods that may be used to prepare and/or deliver an osteochondral plug with enhanced geometrical features. In alternative embodiments, different methods may be used to prepare and/or deliver an osteochondral plug with enhanced geometrical features. Further, the methods set forth in FIG. 13 though FIG. 15 may be used to prepare and/or deliver other osteochondral plugs with enhanced geometrical features besides those specifically disclosed herein.

Reference throughout this specification to "an embodiment" or "the embodiment" means that a particular feature, structure, or characteristic described in connection with that embodiment is included in at least one embodiment. Thus, the quoted phrases, or variations thereof, as recited throughout this specification are not necessarily all referring to the same embodiment. Features and/or method steps of the various embodiments set forth above may be combined together to yield new embodiments. The drawings are drawn to scale, but the shapes and dimensions shown in the drawings are merely exemplary. Various features and/or dimensions may be modified within the understanding of a person of ordinary skill in the art with the aid of the present disclosure.

Similarly, it should be appreciated that in the above description of embodiments, various features are sometimes grouped together in a single embodiment, figure, or description thereof for the purpose of streamlining the present disclosure. This method of disclosure, however, is not to be interpreted as reflecting an intention that any embodiment requires more features than those expressly recited in that embodiment. Rather, inventive aspects lie in a combination of fewer than all features of any single foregoing disclosed embodiment.

Recitation of the term "first" with respect to a feature or element does not necessarily imply the existence of a second or additional such feature or element. Elements recited in means-plus-function format are intended to be construed in accordance with 35 U.S.C. § 112(f). It will be apparent to those having skill in the art that changes may be made to the details of the above-described embodiments without departing from the underlying principles set forth herein.

The phrases "connected to," "coupled to," "engaged with," and "in communication with" refer to any form of interaction between two or more entities, including mechanical, electrical, magnetic, electromagnetic, fluid, and thermal interaction. Two components may be functionally coupled to each other even though they are not in direct contact with each other. The term "coupled" can include components that are coupled to each other via integral formation, as well as components that are removably and/or non-removably coupled with each other. The term "abutting" refers to items that may be in direct physical contact with each other, although the items may not necessarily be attached together. The phrase "fluid communication" refers to two or more features that are connected such that a fluid within one feature is able to pass into another feature. Moreover, as defined herein the term "substantially" means within +/−20% of a target value, measurement, or desired characteristic.

While specific embodiments and applications of the present disclosure have been illustrated and described, it is to be understood that the scope of this disclosure is not limited to the precise configuration and components disclosed herein. Various modifications, changes, and variations which will be apparent to those skilled in the art may be made in the arrangement, operation, and details of the devices, systems, and methods disclosed herein.

What is claimed is:

1. A method of preparing and/or delivering an osteochondral plug, the method comprising:
   positioning a tissue graft on a cutting guide, wherein the tissue graft has been removed from a larger body of tissue to define a shaped surface, the tissue graft comprising a top surface comprising a cartilage surface; and
   with the cutting guide, advancing a first cutter along a cutting direction toward the tissue graft to cut the tissue graft to form the osteochondral plug comprising an external wall parallel to the cutting direction and transverse to the top surface;
   wherein:
      positioning the tissue graft on the cutting guide comprises abutting the top surface against a registration surface of the cutting guide;
      the registration surface has a reference shape that corresponds to a shape of at least part of the top surface;
      the tissue graft further comprises a bottom surface; and
      the method further comprises, prior to advancing the first cutter along the cutting direction to cut the tissue graft:
      measuring a surface angle of tissue needed at a graft recipient site; and
      selecting the cutting direction such that, relative to the bottom surface and/or the external wall, the top surface is oriented at the surface angle.

2. The method of claim 1, further comprising, prior to positioning the tissue graft on the cutting guide, removing the tissue graft from the larger body of tissue.

3. The method of claim 1, wherein the first cutter comprises a trephine comprising a trephine bore configured to receive the osteochondral plug in the trephine bore as the first cutter advances along the cutting direction.

4. The method of claim 1, wherein:
   the tissue graft further comprises a bottom surface; and
   the method further comprises, prior to advancing the first cutter along the cutting direction to cut the tissue graft:
      measuring a surface angle of tissue needed at a graft recipient site; and
      selecting the cutting direction such that, relative to the bottom surface and/or the external wall, the top surface is oriented at the surface angle.

5. The method of claim 1, wherein selecting the cutting direction comprises selecting from a discrete number of cutting directions displaced from each other by an angular offset.

6. The method of claim 1, further comprising, prior to advancing the first cutter along the cutting direction, coupling a guide sleeve to the cutting guide such that the guide sleeve extends along the cutting direction relative to the cutting guide;
   wherein advancing the first cutter along the cutting direction comprises guiding advancement of the first cutter with the guide sleeve.

7. The method of claim 6, wherein:
   the guide sleeve comprises a fin;
   the cutting guide comprises a plurality of slots oriented at different angles relative to each other; and
   coupling the guide sleeve to the cutting guide comprises inserting the fin into one slot of the plurality of slots that corresponds to the cutting direction.

8. The method of claim 1, wherein:
   the method further comprises advancing a second cutter toward the tissue graft to cut the tissue graft to remove the bottom surface, thereby creating a new bottom surface perpendicular to the cutting direction.

9. The method of claim 8, wherein advancing the second cutter toward the tissue graft comprises guiding the second cutter with a planar guide surface of the cutting guide.

10. The method of claim 8, further comprising, after advancing the first cutter along the cutting direction toward the tissue graft to cut the tissue graft:
    selecting a trial with a trial surface that corresponds to a surface angle of tissue needed at a graft recipient site;
    inserting the trial into a receptacle of a plug cutting guide;
    inserting the osteochondral plug into the plug cutting guide such that the top surface lies along the trial surface; and
    guiding the second cutter with a planar guide surface of the plug cutting guide.

11. The method of claim 1, further comprising, after advancing the first cutter along the cutting direction toward the tissue graft to cut the tissue graft:
    inserting the osteochondral plug into a bore of a delivery device, wherein the bore is shaped to match the external wall;
    aligning the delivery device with a graft recipient site; and
    moving the osteochondral plug from the delivery device to the graft recipient site.

12. The method of claim 11, wherein moving the osteochondral plug from the delivery device to the graft recipient site comprises inserting the osteochondral plug into the graft recipient site along an antegrade direction.

13. The method of claim 11, wherein moving the osteochondral plug from the delivery device to the graft recipient site comprises inserting the osteochondral plug into the graft recipient site along a retrograde direction.

14. The method of claim 11, further comprising, prior to inserting the osteochondral plug into the delivery device, aligning a plug orientation reference of the osteochondral plug with a device orientation reference of the delivery device to determine an orientation of the osteochondral plug;

wherein moving the osteochondral plug from the delivery device to the graft recipient site comprises inserting the osteochondral plug into the graft recipient site at the orientation.

15. The method of claim 14, further comprising, prior to aligning the plug orientation reference with the device orientation reference, inserting a pin into the osteochondral plug to define the plug orientation reference;
wherein:
the delivery device comprises a slot in communication with the bore; and
aligning the plug orientation reference with the device orientation reference comprises inserting the pin into the slot.

16. The method of claim 1, wherein the top surface is non-perpendicular to the cutting direction.

17. A method of preparing and/or delivering an osteochondral plug, the method comprising:
using a cutting guide to advance a first cutter along a cutting direction toward the tissue graft to cut the tissue graft to form an osteochondral plug comprising an external wall parallel to the cutting direction;
inserting a pin into the osteochondral plug at a predetermined orientation, the osteochondral plug comprising:
the external wall; and
a top surface;
wherein the external wall extends transverse to the top surface;
inserting the osteochondral plug into a bore of a delivery device such that the pin is received in a slot of the delivery device to establish an orientation of the osteochondral plug; and
moving the osteochondral plug from the delivery device to a graft recipient site at the orientation.

18. The method of claim 17, wherein:
the osteochondral plug further comprises a bottom surface transverse to the external wall; and
the method further comprises:
measuring a surface angle of a surface of surrounding tissue at the graft recipient site; and
forming the osteochondral plug such that the top surface is at the surface angle, relative to the bottom surface;
wherein moving the osteochondral plug from the delivery device to the graft recipient site at the orientation comprises placing the osteochondral plug in the graft recipient site such that the top surface is at the surface angle that matches the surface of surrounding tissue of the graft recipient site.

19. The method of claim 17, wherein inserting the pin into the osteochondral plug comprises inserting the pin into the external wall.

20. The method of claim 17, wherein moving the osteochondral plug from the delivery device to the graft recipient site comprises inserting the osteochondral plug into the graft recipient site along an antegrade direction.

21. The method of claim 17, wherein moving the osteochondral plug from the delivery device to the graft recipient site comprises inserting the osteochondral plug into the graft recipient site along a retrograde direction.

22. A method of preparing and/or delivering an osteochondral plug, the method comprising:
positioning a tissue graft on a cutting guide, the tissue graft comprising a top surface comprising a cartilage surface;
securing the top surface such that the top surface abuts a flat registration surface of the cutting guide; and
with the cutting guide, advancing a first cutter along a cutting direction toward the tissue graft to cut the tissue graft to form the osteochondral plug comprising an external wall, wherein the external wall is parallel to the cutting direction and transverse to the top surface.

23. The method of claim 22, further comprising, prior to positioning the tissue graft on the cutting guide, removing the tissue graft from a larger body of tissue.

24. The method of claim 22, wherein the first cutter comprises a trephine comprising a trephine bore configured to receive the osteochondral plug in the trephine bore as the first cutter advances along the cutting direction.

25. The method of claim 22, where:
the tissue graft further comprises a bottom surface transverse to the external wall; and
the method further comprises, prior to advancing the first cutter along the cutting direction to cut the tissue graft:
measuring a surface angle of tissue needed at a graft recipient site; and
selecting the cutting direction such that, relative to the bottom surface and/or the external wall, the top surface is oriented at the surface angle.

26. The method of claim 25, wherein selecting the cutting direction comprises selecting from a discrete number of cutting directions displaced from each other by an angular offset.

27. The method of claim 25, further comprising, prior to advancing the first cutter along the cutting direction, coupling a guide sleeve to the cutting guide such that the guide sleeve extends along the cutting direction relative to the cutting guide;
wherein advancing the first cutter along the cutting direction comprises guiding advancement of the first cutter with the guide sleeve.

28. The method of claim 27, wherein:
the guide sleeve comprises a fin;
the cutting guide comprises a plurality of slots oriented at different angles relative to each other; and
coupling the guide sleeve to the cutting guide comprises inserting the fin into one slot of the plurality of slots that corresponds to the cutting direction.

29. The method of claim 22, wherein:
the tissue graft further comprises a bottom surface transverse to the external wall; and
the method further comprises advancing a second cutter toward the tissue graft to cut the tissue graft to remove the bottom surface, thereby creating a new bottom surface perpendicular to the cutting direction.

30. The method of claim 29, further comprising, after advancing the first cutter along the cutting direction toward the tissue graft to cut the tissue graft:
selecting a trial with a trial surface that corresponds to a surface angle of tissue needed at a graft recipient site;
inserting the trial into a receptacle of a plug cutting guide;
inserting the osteochondral plug into the plug cutting guide such that the top surface lies along the trial surface; and
guiding the second cutter with a planar guide surface of the plug cutting guide.

31. The method of claim 22, further comprising, after advancing the first cutter along the cutting direction toward the tissue graft to cut the tissue graft:
inserting the osteochondral plug into a bore of a delivery device, wherein the bore is shaped to match the external wall;
aligning the delivery device with a graft recipient site; and moving the osteochondral plug from the delivery device to the graft recipient site.

32. The method of claim 31, wherein moving the osteochondral plug from the delivery device to the graft recipient site comprises inserting the osteochondral plug into the graft recipient site along an antegrade direction.

33. The method of claim 31, wherein moving the osteochondral plug from the delivery device to the graft recipient site comprises inserting the osteochondral plug into the graft recipient site along a retrograde direction.

34. The method of claim 31, further comprising, prior to inserting the osteochondral plug into the delivery device, aligning a plug orientation reference of the osteochondral plug with a device orientation reference of the delivery device to determine an orientation of the osteochondral plug;
wherein moving the osteochondral plug from the delivery device to the graft recipient site comprises inserting the osteochondral plug into the graft recipient site at the orientation.

35. The method of claim 34, further comprising, prior to aligning the plug orientation reference with the device orientation reference, inserting a pin into the osteochondral plug to define the plug orientation reference;
wherein:
the delivery device comprises a slot in communication with the bore; and
aligning the plug orientation reference with the device orientation reference comprises inserting the pin into the slot.

36. The method of claim 22, wherein the top surface and the registration surface are planar.

37. The method of claim 22, wherein the top surface is non-perpendicular to the cutting direction.

\* \* \* \* \*